April 19, 1932. C. F. CRUMB ET AL 1,854,826
WHEEL TIRE STRUCTURE
Filed Nov. 8, 1929  2 Sheets-Sheet 2
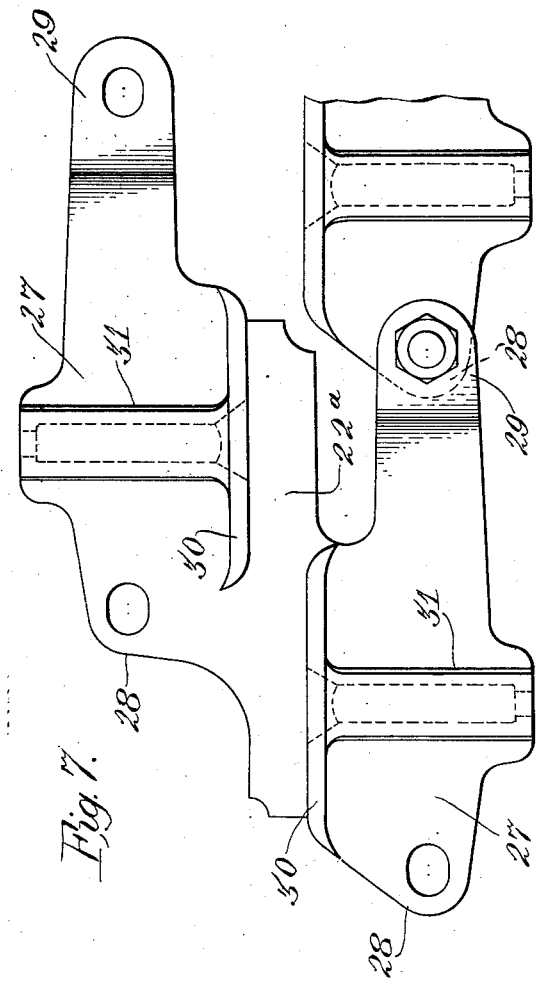
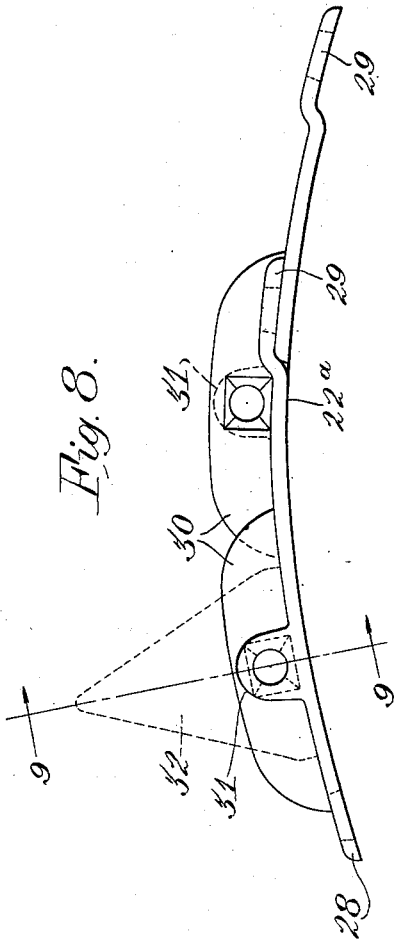
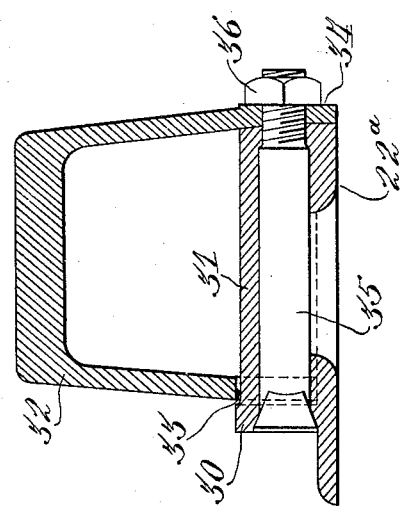
Inventors'
Charles F. Crumb,
and Gustaf Hammer
By _____
Atty.

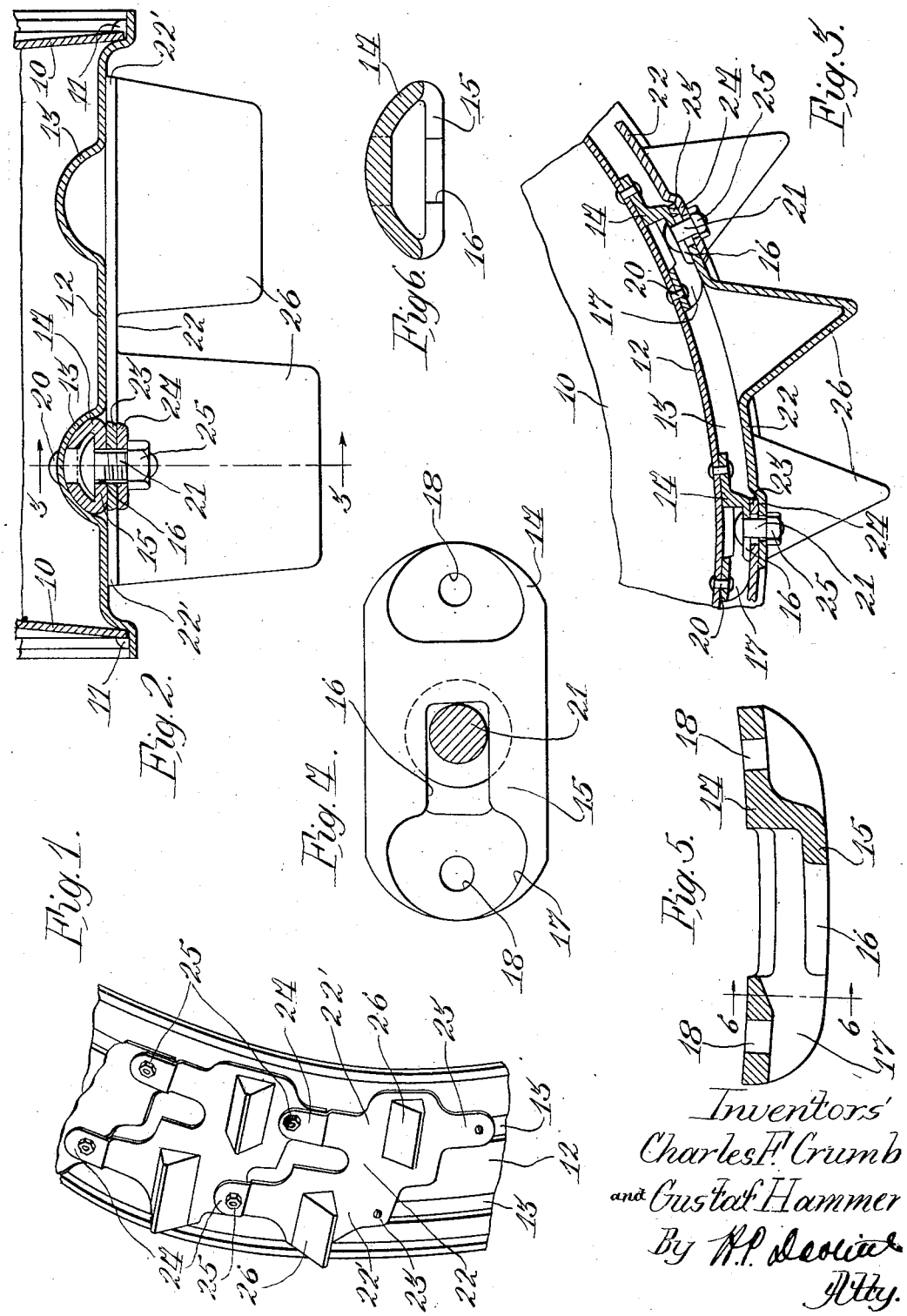

Patented Apr. 19, 1932

1,854,826

UNITED STATES PATENT OFFICE

CHARLES F. CRUMB AND GUSTAF HAMMER, OF CHICAGO, ILLINOIS, ASSIGNORS TO INTERNATIONAL HARVESTER COMPANY, A CORPORATION OF NEW JERSEY

WHEEL TIRE STRUCTURE

Application filed November 8, 1929. Serial No. 405,569.

The invention relates to a wheel tire structure. In certain types of agricultural machinery, for example as in the case of a rice binder, which operates in wet fields, it is important that the wheel be water tight as well as affording good traction.

More particularly, therefore, the invention relates to a wheel tire structure for the main wheel of a rice binder.

An object of the invention is to provide in combination with a wheel tire, means for attaching traction lugs, at the same time maintaining the tire water tight.

Still another object is to provide such a wheel tire structure in which the lugs or the plates carrying them, may be easily and quickly attached and detached.

Other objects will appear as the disclosure is made.

Briefly, these objects may be accomplished in a water tight, drum type of rice binder main wheel, having a tire which is provided with a pair of spaced annular grooves parallel to each other. These grooves have arranged therein, by riveting to the wheel tire, offset cleat members, which include claw portions raised above the cleat to lie circumferentially flush with the curvature of the tire, the claws thereof serving as holding means for bolts positioned radially relative to the tire. Lug plates having ears are then provided, which ears are perforated to permit passage of the bolts therethrough, one bolt securing adjacent ears of two plates to the cleat. The plates comprise two main, offset surfaces or areas, each of which carries a lug in such a manner that the lugs too are relatively offset. So much of a description should suffice for the time being in so far as giving a general view of the structure is concerned.

An illustrative embodiment and modification of the invention are shown in the accompanying sheets of drawings, in which,—

Figure 1 is a fragmentary, perspective view of a wheel tire with the lugs mounted thereon;

Figure 2 is a transverse, cross sectional view through the tire;

Figure 3 is a circumferential, side sectional, view of a fragment of the tire and lug structure connected thereto, as seen along the section line 3—3, when looking in the direction of the arrows, shown in Figure 2;

Figure 4 is a plan detail view of a cleat;

Figure 5 is a longitudinal, side sectional view, taken centrally through the cleat appearing in Figure 4;

Figure 6 is a transverse, cross sectional, view through the cleat, as seen on the line 6—6, when looking in the direction of the arrows, appearing in Figure 5;

Figure 7 is a plan view of a modified form of lug plate;

Figure 8 is a side view of this modified form of lug plate; and,

Figure 9 is a transverse, sectional view, through the lug plate, as would appear along the line 9—9 when looking in the direction of the arrows appearing in Figure 8.

The illustrative wheel shown is of the drum type having disk sides 10, to the outer peripheral edges of which is secured, by welding 11, an inset tire 12. The welding 11 makes a water tight connection between the sides 10 and tire 12.

The tire 12 is provided with depressions in the form of spaced, parallel, circumferential grooves 13. It is desired to affix lugs, for traction purposes, to this tire without perforating the same in such a manner as would cause the same to be leaky. Therefore, these grooves 13 carry, in offset position relative to one another, cleats 14 appearing in Figures 4, 5 and 6, which cleats include raised claw portions 15, providing a slot 16 and an enlarged entrance cut-out 17 leading to the slot 16. The ends of the cleat are perforated at 18 to provide openings for rivets 20, which serve as water tight securing means for mounting these cleats 14 in the grooves 13, as is best shown in Figures 2 and 3.

Each claw of each cleat has passed into the entrance-way 17 a radially extending, headed bolt 21 in such a manner that the head is slidingly locked under the claw part 15, laterally adjacent bolts 21 being relatively offset, as appears best in Figure 1.

The next step in the assembly of the wheel tire structure is to provide the lug carrying plates 22, which, as best shown in Figure 1, are of a peculiar shape involving two main, offset surfaces or areas 22'. Each such offset portion 22' has a rear perforated ear 23 and a front perforated ear 24, which ears 24 are raised slightly above the main surface of the lug plates, so that adjacent rear ears 23 of a contiguous lug plate may be lapped underneath said front ears 24. The bolts 21, it can now be readily understood, will be passed through the rear ears 23 of one plate and through the raised ears 24 of the adjacent plate. Nuts 25 are then provided to lock the plates in place. Each plate 22 at its enlarged surface 22' carries a spade-type lug 26, there being a pair of such lugs on each plate 22 and arranged in relatively offset position, as shown clearly in Figure 1.

In the forms shown in Figures 1 to 6, inclusive, the lugs 26 are integrally formed as a part of the plates 22. At times it may be desirable to have lugs 26 which would be separable from the plates 22.

This invention contemplates such a modified structure as appears in Figures 7, 8 and 9 where, as best shown in Figure 7, the lug plate is shown at 22ª, having two main surfaces 27, provided with rear perforated ears 28 and front raised perforated ears 29. Two offset, perpendicularly arranged walls or flanges, extending circumferentially are provided at 30, from which extend transverse sleeves 31. The lugs, as shown in Figure 9, appear at 32 provided with end openings 33 and opposite overhanging end edges 34. The lug 32 is placed over a sleeve 31 with the overhanging end thereof perforated and set flatly against the end of the sleeve 31 remote from the wall 30. A bolt 35 is then passed through the sleeve 31 and a nut 36 completes the assembly of the detachable lug for the lug plate 22ª.

From this detailed description it must now be appreciated that an improved form of wheel tire structure has been provided, which achieves all of the desirable objects of the invention heretofore recited. In the first form of the invention, the lug plates with the integral lugs are quickly attachable and detachable to and from the cleats, which are riveted in the grooves to the tire and remain as a part of the wheel tire. These cleats remain in position, even when the lug carrying plates have been removed, and, as the outer surfaces of the cleats lie substantially flush with the tread surface of the wheel tire, they form no obstruction and act as a part of the tire load carrying surface. In the modification, the lug plates may remain with the cleats on the tire and only the lugs 32, which are separable, may be attached or detached, if desired.

It is the intention to cover all such changes and modifications of this invention, which do not depart from the spirit and scope thereof, as is indicated by the scope of the definitions embodied in the following claims.

What is claimed is:

1. The combination of a wheel tire having a depression therein, a cleat secured to the tire in the depression, said cleat lying flush with the tread surface of the tire a plate secured to the cleat, said plate having a perpendicular circumferential flange and a transverse sleeve, a lug arranged over the sleeve with one end of the lug arranged adjacent the flange, and a transverse bolt passed through the sleeve and flange to secure the lug to the plate.

2. The combination with a wheel tire having a depressed circular groove formed therein, of a cleat having apertured ends to receive fastening means permanently securing said cleat in the groove to the tire, said cleat having a raised portion formed at one end with an enlarged entrance cut out leading to a slot extending part way across the raised portion, a bolt having a head to fit the entrance cut out and adapted to be slid under the raised portion with its shank protruding radially out through the said slot, said raised portion lying flush with the tread surface of the tire, a plate adapted to be detachably secured to the wheel tire by said bolt, and a lug carried by said plate.

3. The combination of a wheel tire having a depression therein, a cleat secured to the tire in the depression and provided with a raised claw portion lying flush with the tread surface of the tire, a lug carrying plate, and a bolt held by the claw portion to secure the plate to the tire.

4. The combination of a wheel tire having an annular groove formed therein, a cleat having a raised claw portion which lies flush with the tread surface of the tire, said cleat being riveted in the groove to the tire, a lug plate, and a bolt held by the cleat claw to secure the lug plate to the tire.

5. The combination of a wheel tire having an annular groove formed therein, a cleat having a raised claw portion, said cleat being riveted in the groove to the tire whereby the claw portion lies flush with the tread surface of the tire, a lug plate, and a headed bolt slid into the claw portion with the head thereunder and the bolt extending radially outward relative to the tire removably to secure the lug plate to the tire.

In testimony whereof we affix our signatures.

CHARLES F. CRUMB.
GUSTAF HAMMER.